(12) United States Patent
Lin

(10) Patent No.: US 7,250,694 B2
(45) Date of Patent: Jul. 31, 2007

(54) POWER-SAVING CONTROL MODULE FOR AN ELECTRICAL APPLIANCE

(75) Inventor: Chun-Fu Lin, Chung Ho (TW)

(73) Assignee: Top Victory Electronics (Taiwan) Co., Ltd., Taipei Hsien (TW)

( * ) Notice: Subject to any disclaimer, the term of this patent is extended or adjusted under 35 U.S.C. 154(b) by 295 days.

(21) Appl. No.: 11/098,206

(22) Filed: Apr. 4, 2005

(65) Prior Publication Data
US 2006/0220467 A1 Oct. 5, 2006

(51) Int. Cl.
*H02J 3/02* (2006.01)
(52) U.S. Cl. .......................... 307/22; 307/26
(58) Field of Classification Search .................. 307/22, 307/26
See application file for complete search history.

(56) References Cited
U.S. PATENT DOCUMENTS 6,104,622 A * 8/2000 Shin .......................... 363/21.07
6,430,062 B1 * 8/2002 Shin .......................... 362/21.01
6,678,173 B2 * 1/2004 Nakagawa .................... 363/44

* cited by examiner

Primary Examiner—Michael Sherry
Assistant Examiner—Hal I. Kaplan
(74) Attorney, Agent, or Firm—Whyte Hirschboeck Dudek SC

(57) ABSTRACT

In a power-saving control module for an electrical appliance that includes a DC power supply and a remote control receiver, a switch component serves to make or break electrical connection between an AC power source and the DC power supply, a diode provides a path for supply of a DC power output from the DC power supply to the remote control receiver when connection between the DC power supply and the AC power source is made, and a rechargeable power source provides DC power to the remote control receiver when connection between the DC power supply and the AC power source is broken. A driver is controlled by the remote control receiver so as to cause the switch component to make or break the electrical connection between the AC power source and the DC power supply.

14 Claims, 1 Drawing Sheet

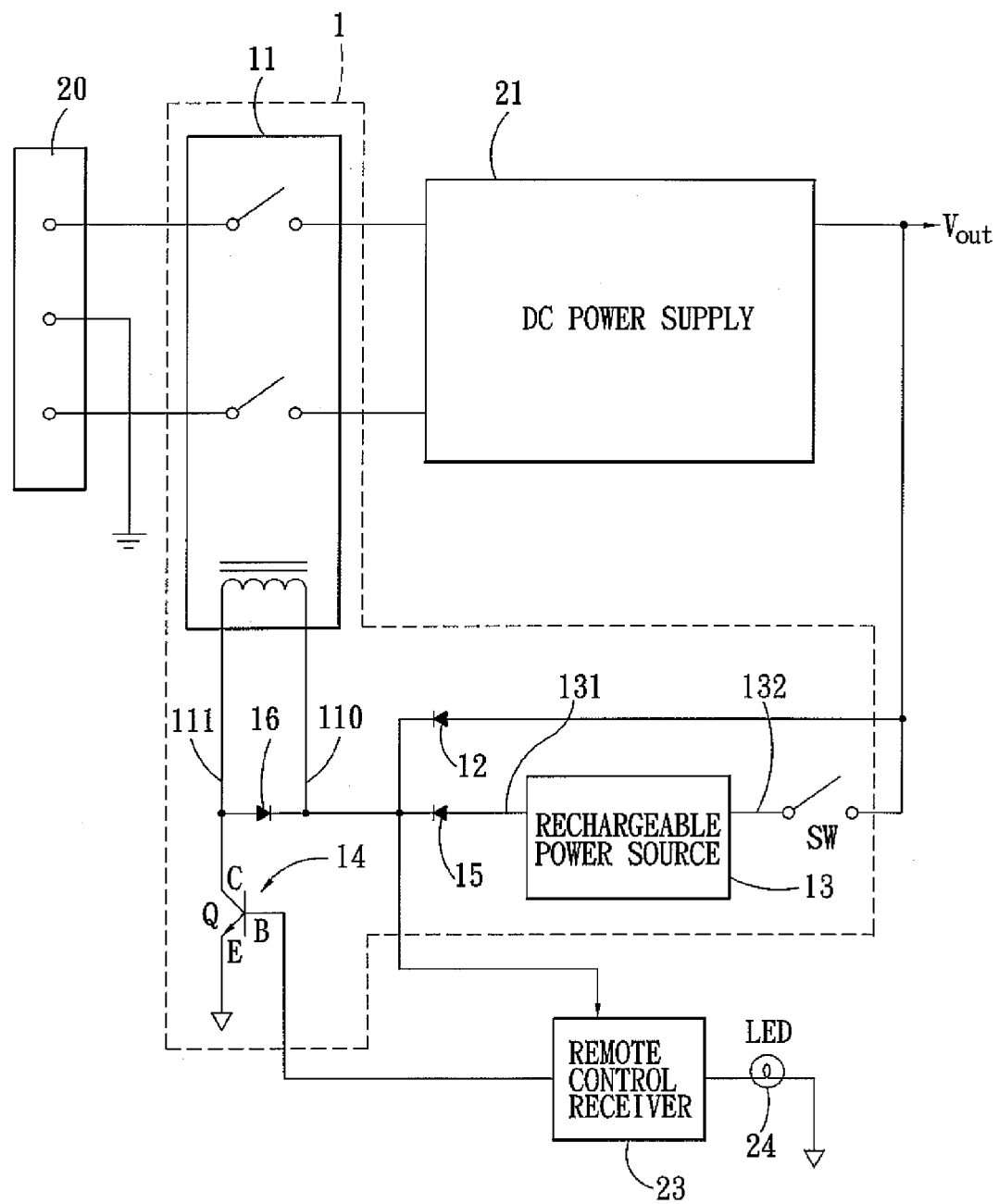

POWER-SAVING CONTROL MODULE FOR AN ELECTRICAL APPLIANCE

BACKGROUND OF THE INVENTION

1. Field of the Invention

The invention relates to a power-saving control module, more particularly to a power-saving control module that enables supply of electric power to a remote control receiver of an electrical appliance even when connection of the electrical appliance to an alternating current power source is broken.

2. Description of the Related Art

For an electrical appliance with a remote control capability (that is, having a built-in remote control receiver for receiving remote control signals), in order to enable activation of the electrical appliance from a power-off state by remote control, connection between the electrical appliance and a commercial AC power source must be maintained so that power is always supplied to the remote control receiver. As such, the remote control receiver can be kept in a standby state so as to monitor the presence of a power-on signal for activating the electrical appliance received from a remote control transmitter. Hence, even when the electrical appliance is in an idle state, it still consumes some amount of electric power, which results in waste of energy.

SUMMARY OF THE INVENTION

Therefore, the object of the present invention is to provide a power-saving control module for an electrical appliance that can overcome the aforesaid drawback of the prior art.

Another object of the present invention is to provide an electrical appliance that incorporates a power-saving control module for achieving zero power consumption when the electrical appliance is idle.

According to one aspect of the present invention, a power-saving control module is adapted to be coupled between an alternating current (AC) power source and a direct current (DC) power supply, and is adapted to be controlled by a remote control receiver. The DC power supply is capable of generating a DC power output upon receipt of an AC power input from the AC power source. The remote control receiver is capable of generating an enable signal upon receipt of a power-on signal, and generating a disable signal upon receipt of a power-off signal.

The power-saving control module comprises a switch component, a diode, a rechargeable power source, and a driver.

The switch component is adapted to be coupled electrically between the AC power source and the DC power supply, and is operable so as to make or break electrical connection between the AC power source and the DC power supply.

The diode is adapted to be coupled electrically to the DC power supply and the remote control receiver, and provides a path for supply of the DC power output to the remote control receiver when connection between the DC power supply and the AC power source is made.

The rechargeable power source is adapted to be coupled electrically to the DC power supply and the remote control receiver, is recharged through the DC power output from the DC power supply when connection between the DC power supply and the AC power source is made, and provides DC power to the remote control receiver when connection between the DC power supply and the AC power source is broken.

The driver is coupled electrically to the switch component, and is adapted to be coupled electrically to the remote control receiver. The driver is responsive to the enable signal from the remote control receiver for causing the switch component to make electrical connection between the AC power source and the DC power supply, and to the disable signal from the remote control receiver for causing the switch component to break the electrical connection between the AC power source and the DC power supply.

According to another aspect of the present invention, an electrical appliance is adapted to be coupled to an AC power source, and comprises a DC power supply, a remote control receiver, and a power-saving control module.

The DC power supply generates a DC power output upon receipt of an AC power input from the AC power source.

The remote control receiver generates an enable signal upon receipt of a power-on signal, and generates a disable signal upon receipt of a power-off signal.

The power-saving control module includes a switch component, a diode, a rechargeable power source, and a driver.

The switch component is adapted to be coupled electrically between the AC power source and the DC power supply, and is operable so as to make or break electrical connection between the AC power source and the DC power supply.

The diode is coupled electrically to the DC power supply and the remote control receiver, and provides a path for supply of the DC power output to the remote control receiver when connection between the DC power supply and the AC power source is made.

The rechargeable power source is coupled electrically to the DC power supply and the remote control receiver, is recharged through the DC power output from the DC power supply when connection between the DC power supply and the AC power source is made, and provides DC power to the remote control receiver when connection between the DC power supply and the AC power source is broken.

The driver is coupled electrically to the switch component and the remote control receiver. The driver is responsive to the enable signal from the remote control receiver for causing the switch component to make electrical connection between the AC power source and the DC power supply, and to the disable signal from the remote control receiver for causing the switch component to break the electrical connection between the AC power source and the DC power supply.

BRIEF DESCRIPTION OF THE DRAWING

Other features and advantages of the present invention will become apparent in the following detailed description of the preferred embodiment with reference to the accompanying drawing, of which:

The FIGURE is a schematic circuit diagram of an electrical appliance that incorporates the preferred embodiment of a power-saving control module according the present invention.

DETAILED DESCRIPTION OF THE PREFERRED EMBODIMENT

Referring to the FIGURE, the preferred embodiment of a power-saving control module 1 according to the present invention is shown to be adapted to be coupled between an alternating current (AC) power source 20 and a direct current (DC) power supply 21, and is adapted to be controlled by a remote control receiver 23. The power-saving control module 1, the DC power supply 21 and the remote control receiver 23 are built into an electrical appliance, such as a liquid crystal display device, a DVD player, etc., that can be controlled remotely. The DC power supply 21 is capable of generating a DC power output (Vout) necessary for operation of the electrical appliance upon receipt of an AC power input from the AC power source 20. The remote control receiver 23 is capable of generating an enable signal upon receipt of a power-on signal transmitted from a remote control transmitter (not shown), and generates a disable signal upon receipt of a power-off signal transmitted from the remote control transmitter (not shown). Since the DC power supply 21 and the remote control receiver 23 are conventional in construction and are not pertinent to the claimed invention, a detailed description of the same will be dispensed with herein for the sake of brevity.

The power-saving control module 1 comprises a switch component 11, a first diode 12, a second diode 15, a rechargeable power source 13, and a driver 14.

In this embodiment, the switch component 11 includes a relay having a first control end 110 and a second control end 111. The switch component 11 is adapted to be coupled electrically between the AC power source 20 and the DC power supply 21, and is operable so as to make or break electrical connection between the AC power source 20 and the DC power supply 21 in a manner to be described hereinafter.

The first diode 12 includes an anode adapted to be coupled electrically to the DC power supply 21, and a cathode coupled electrically to the remote control receiver 23. The first diode 12 provides a path for supply of the DC power output (Vout) to the remote control receiver 23 when connection between the DC power supply 21 and the AC power source 20 is made by the switch component 11.

The second diode 15 includes an anode, and a cathode coupled electrically to the cathode of the first diode 12 and to the first control end 110 of the switch component 11.

The rechargeable power source 13 is a direct current (DC) power source, includes an output end 131 coupled electrically to the anode of the second diode 15, and an input end 132 to be coupled electrically to the DC power supply 21 so as to receive the DC power output (Vout) therefrom. The rechargeable power source 13 is recharged through the DC power output (Vout) from the DC power supply 21 when connection between the DC power supply 21 and the AC power source 20 is made by the switch component 11. In this embodiment, the rechargeable power source 13 includes a control switch (SW) coupled electrically between the input end 132 and the DC power supply 21. The control switch (SW) is controlled by the rechargeable power source 13 to break electrical connection between the rechargeable power source 13 and the DC power supply 21 when the rechargeable power source 13 is in a recharged state, and to make electrical connection between the rechargeable power source 13 and the DC power supply 21 when otherwise. The rechargeable power source 13 further provides DC power to the remote control receiver 23 through the second diode 15 when connection between the DC power supply 21 and the AC power source 20 is broken by the switch component 11.

In this embodiment, the driver 14 includes an n-type transistor, which has a collector (C) coupled electrically to the second control end 111 of the switch component 11, a base (B) adapted to be coupled electrically to the remote control receiver 23, and a grounded emitter (E). The driver 14 conducts in response to the enable signal from the remote control receiver 23, thus energizing the switch component 11 so as to make electrical connection between the AC power source 20 and the DC power supply 21. The remote control receiver 23 continues to supply the enable signal to the driver 14 until the remote control receiver 23 receives the power-off signal from the remote control transmitter (not shown).

When the remote control receiver 23 generates the disable signal that is provided to the driver 14 in response to the power-off signal from the remote control transmitter (not shown), the driver 14 ceases to conduct, thereby de-energizing the switch component 11 so as to break the electrical connection between the AC power source 20 and the DC power supply 21. At this time, the DC power supply 21 is no longer able to provide DC power output (Vout) to the switch component 11, the rechargeable power source 13, and to the various components of the electrical appliance so as to achieve the effect of zero power consumption.

When the electrical connection between the AC power source 20 and the DC power supply 21 is broken by the switch component 11, activation of the electrical appliance by remote control is still possible in view of the rechargeable power source 13. In particular, since the rechargeable power source 13 is in a recharged state, it is able to supply the DC power to the switch component 11 and the remote control receiver 23, such that the remote control receiver 23 can operate in a standby mode so as to monitor the presence of the power-on signal for activating the electrical appliance received from the remote control transmitter (not shown). Therefore, upon receipt of the power-on signal, the remote control receiver 23 once again provides the enable signal to enable the driver 14 to conduct for energizing the switch component 11, thereby making electrical connection between the AC power source 20 and the DC power supply 21, such that the DC power supply 21 is once again able to provide the DC power output (Vout) necessary for operation of the electrical appliance. Since the DC power output (Vout) is higher than the voltage of the rechargeable power source 13, the DC power output (Vout) is able to replace the rechargeable power source 13 for providing power to the remote control receiver 23 and the switch component 11 when the switch component 11 is energized, and the rechargeable power source 13 can be recharged once again through the DC power output (Vout) from the DC power supply 21.

Preferably, a third diode 16 is coupled electrically between the first and second control ends 110, 111 of the switch component 11 for blocking back electromotive force generated when current flow is interrupted. In addition, a light emitting diode 24 may be coupled to and controlled by the remote control receiver 23 for generating different colors of light to indicate different operating states of the electrical appliance, such as, green light for indicating a power-on state, orange light for indicating a remote control standby state, red light for indicating a remote control shutdown state, etc.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A power-saving control module adapted to be coupled between an alternating current (AC) power source and a direct current (DC) power supply and adapted to be controlled by a remote control receiver, the DC power supply being capable of generating a DC power output upon receipt of an AC power input from the AC power source, the remote control receiver being capable of generating an enable signal upon receipt of a power-on signal, and generating a disable signal upon receipt of a power-off signal, said power-saving control module comprising:

a switch component adapted to be coupled electrically between the AC power source and the DC power supply, and operable so as to make or break electrical connection between the AC power source and the DC power supply;

a first diode adapted to be coupled electrically to the DC power supply and the remote control receiver, and providing a path for supply of the DC power output to the remote control receiver when connection between the DC power supply and the AC power source is made;

a rechargeable power source adapted to be coupled electrically to the DC power supply and the remote control receiver, said rechargeable power source being recharged through the DC power output from the DC power supply when connection between the DC power supply and the AC power source is made, said rechargeable power source providing DC power to the remote control receiver when connection between the DC power supply and the AC power source is broken; and a driver coupled electrically to said switch component and adapted to be coupled electrically to the remote control receiver, said driver being responsive to the enable signal from the remote control receiver for causing said switch component to make electrical connection between the AC power source and the DC power supply, and to the disable signal from the remote control receiver for causing said switch component to break the electrical connection between the AC power source and the DC power supply.

2. The power-saving control module as claimed in claim 1, wherein said switch component includes a relay.

3. The power-saving control module as claimed in claim 2, wherein said driver includes a transistor.

4. The power-saving control module as claimed in claim 3, wherein:

said relay has a first control end coupled electrically to said first diode and said rechargeable power source, and a second control end;

said transistor having a collector coupled electrically to said second control end of said relay, a base adapted to be coupled electrically to the remote control receiver, and a grounded emitter.

5. The power-saving control module as claimed in claim 4, further comprising a second diode coupled electrically between said rechargeable power source and said first diode.

6. The power-saving control module as claimed in claim 4, further comprising a third diode coupled electrically between said first and second control ends of said relay.

7. The power-saving control module as claimed in claim 1, wherein said rechargeable power source includes a control switch for breaking electrical connection between said rechargeable power source and the DC power supply when said rechargeable power source is in a recharged state.

8. An electrical appliance adapted to be coupled to an alternating current (AC) power source, said electrical appliance comprising:

a direct current (DC) power supply for generating a DC power output upon receipt of an AC power input from the AC power source;

a remote control receiver for generating an enable signal upon receipt of a power-on signal, and for generating a disable signal upon receipt of power-off signal; and a power-saving control module including:

a switch component adapted to be coupled electrically between the AC power source and said DC power supply, and operable so as to make or break electrical connection between the AC power source and said DC power supply;

a first diode coupled electrically to said DC power supply and said remote control receiver, and providing a path for supply of the DC power output to said remote control receiver when connection between said DC power supply and the AC power source is made;

a rechargeable power source coupled electrically to said DC power supply and said remote control receiver, said rechargeable power source being recharged through the DC power output from said DC power supply when connection between said DC power supply and the AC power source is made, said rechargeable power source providing DC power to said remote control receiver when connection between said DC power supply and the AC power source is broken; and a driver coupled electrically to said switch component and said remote control receiver, said driver being responsive to the enable signal from said remote control receiver for causing said switch component to make electrical connection between the AC power source and said DC power supply, and to the disable signal from said remote control receiver for causing said switch component to break the electrical connection between the AC power source and said DC power supply.

9. The electrical appliance as claimed in claim 8, wherein said switch component includes a relay.

10. The electrical appliance as claimed in claim 9, wherein said driver includes a transistor.

11. The electrical appliance as claimed in claim 10, wherein:

said relay has a first control end coupled electrically to said first diode and said rechargeable power source, and a second control end;

said transistor having a collector coupled electrically to said second control end of said relay, a base coupled electrically to said remote control receiver, and a grounded emitter.

12. The electrical appliance as claimed in claim 11, wherein said power-saving control module further includes a second diode coupled electrically between said rechargeable power source and said first diode.

13. The electrical appliance as claimed in claim 11, wherein said power-saving control module further includes a third diode coupled electrically between said first and second control ends of said relay.

14. The electrical appliance as claimed in claim 8, wherein said rechargeable power source includes a control switch for breaking electrical connection between said rechargeable power source and said DC power supply when said rechargeable power source is in a recharged state.

* * * * *